Sept. 2, 1969      H. P. UTECH ET AL      3,464,812
PROCESS FOR MAKING SOLIDS AND PRODUCTS THEREOF
Filed March 29, 1966

INVENTOR
HARVEY P. UTECH
MERTON C. FLEMING
BY
Thomas & Thomas
ATTORNEY

United States Patent Office 3,464,812
Patented Sept. 2, 1969

3,464,812
PROCESS FOR MAKING SOLIDS AND
PRODUCTS THEREOF
Harvey P. Utech, Washington, D.C., and Merton C. Flemings, Lexington, Mass.; said Flemings assignor to Massachusetts Institute of Technology, Cambridge, Mass., a corporation of Massachusetts
Filed Mar. 29, 1966, Ser. No. 538,261
Int. Cl. C22b 9/02; B01j 17/02, 17/36
U.S. Cl. 75—65          3 Claims

ABSTRACT OF THE DISCLOSURE

A solidification process in which a unidirectional stationary magnetic field is applied to the molten zone of the material in the region where the transition to the solid state is occurring. The material has some electrical conductivity in the liquid state and the field is of sufficient magnitude to increase substantially the effective viscosity of the molten zone and thus damp thermally induced laminar and turbulent flow to produce more uniform solidification products.

---

Figure 1:
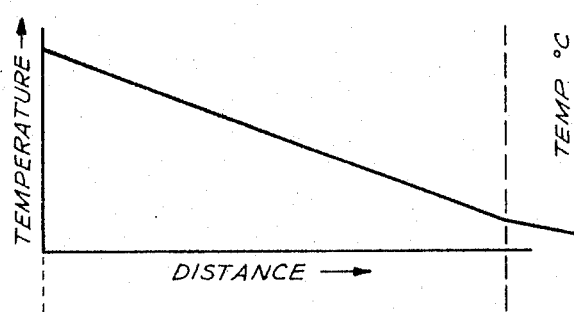

This invention relates to a process for controlled solidification and the products thereof. It is applicable particularly to processes for producing crystals, and to products of such processes. More particularly, it relates to methods and techniques for controlling convective flow in molten materials for the purpose of altering or controlling the structure and properties of solids grown or otherwise formed from such molten materials. The invention is particularly applicable to production of monocrystals, and to improved products resulting therefrom, but it is not limited to monocrystals. It is especially suitable for production of metal and semiconductor crystals, but, again, is not limited to such.

It has been known that crystals, e.g., monocrystals of metals, semiconductive materials and the like, can be grown from a molten material or "melt," while subjecting the melt to a controlled temperature gradient. The crystal ordinarily grows at the point of lowest temperature. Its rate of growth and the uniformity of such rate often has important effects on the crystal properties. Fluctuations in certain variables, e.g., the crystallization rate, due for example of fluctuations in temperature superimposed on the overall temperature gradient, etc., may produce striations or bands of solute or other objectionable non-uniformities in the product crystal. One object of the present invention is to prevent formation of undesirable non-uniformities in the product.

Another object is to maintain better control over the crystallization or solidification process by reducing or eliminating fluctuations in the process conditions such as temperature and temperature gradients, rate of flow or other movement, and the like.

Still another and more specific object is to suppress objectionable eddy currents in the melt and other objectionable motions in the liquid which may impair quality or otherwise alter the structure of the solidification product, monocrystalline or otherwise.

Further objects and advantages of the invention will appear more fully as a detailed description of presently preferred embodiments and aspects of the invention is given.

Conventional processes involving solidification, such as zone melting, crystal growth, and casting are commonly characterized by either compositional gradients in the liquid, temperature gradients, or both. Since liquid density is in general a function of both composition and temperature, it follows that in practice most melts also contain density gradients. The orientation of the density gradient with respect to gravity usually determines whether convective flow will occur. When the most dense liquid is at the bottom of a container, for example, and there is a vertical density gradient, the lightest liquid being at the top of the container, the system is stable and no mass flow occurs. However, in any arrangement other than the foregoing, for example when there is a horizontal density gradient, or if there is a negative vertical gradient in one or more areas with the hottest and lightest liquid on the bottom and the heaviest on top, the system will in general be unstable and mass flow, usually referred to as natural convection, will result.

A preferred embodiment of the invention will now be described with reference to the attached drawings, but it will be understood that the invention is not limited thereto.

Figure 2:
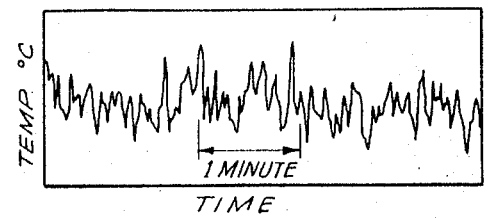
Figure 3:
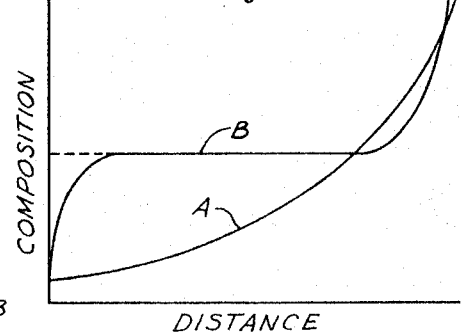
Figure 4:
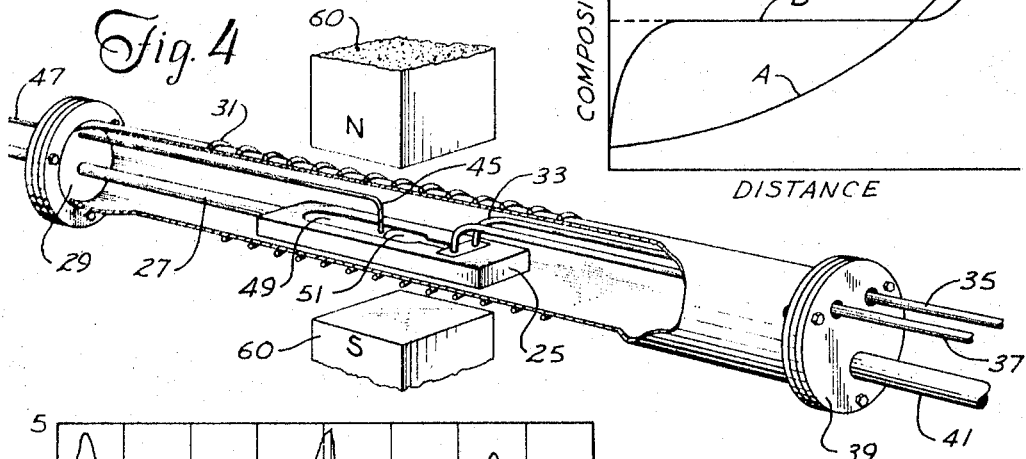
Figure 5:
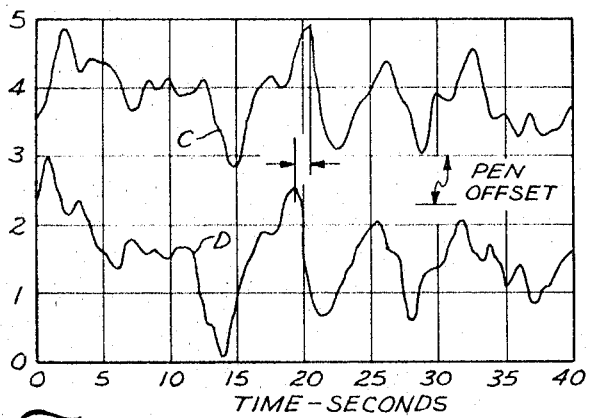

In the drawings:

FIGURE 1 shows a sketch in diagrammatic vertical section of a horizontal boat of the type often used to grow crystals from molten metals, semiconductors, salts and the like, FIGURE 2 shows a graph of thermal fluctuations typical of prior art operations, FIGURE 3 is a diagram of one effect of the method of this invention on solute distribution in solids, FIGURE 4 shows a preferred form of apparatus, in outline perspective, for carrying out the process, and FIGURE 5 is a graph showing a way of measuring liquid flow rates.

Referring first to FIGURE 1, under typical conditions, there will be a horizontal temperature gradient in the boat as shown at the top of the figure. Liquid at the hot end of the boat (at the left) will be relatively light and tend to rise; that at the cold end (at the right) will be relatively dense and tend to sink. A circulation pattern will arise in the boat as shown in the figure. Under usual conditions, considerable turbulence in flow occurs.

Insertion of sensitive thermocouples into the melt at multiple points reveals that the flow is characterized by erratic temperature fluctuations in the melt, an indication of turbulence. An example of such fluctuations is shown diagrammatically in FIGURE 2. These apparently are caused particularly or largely by small local eddy currents, indicated by arrows E, FIGURE 1. The amplitude and frequency of the fluctuations both increase with an increasing horizontal temperature gradient as does the mean flow velocity. Erratic temperature fluctuations of the type shown in FIGURE 2 have also been observed in the Czochralski crystal growing system by Wilcox and Fullmer, as reported in the Journal of Applied Physics 36, 2201 (1965) and would be expected to be present in any other system in which density gradients were such as to lead to turbulent flow.

The presence of convective flow in the horizontal boat is also characterized by a vertical temperature gradient. In the absence of temperature fluctuations, the magnitude of the vertical gradient gives a qualitative indication of the extent of laminar flow.

While the horizontal boat is presented as an example, it must be emphasized that the above considerations apply generally to any system in which density gradients cause mass motion.

The known effects of mass flow on solids grown from melts in which flow is occurring are several:

(1) Turbulent convection is largely responsible for the formation of striations or bands of solute along plane perpendicular to the direction of growth in solids grown from the melt. This effect has been documented by A. Mueller and M. Wilhelm in Zeitschrift fur Naturforshung 19a, 254 (1964) for the case of horizontally solidified semiconductors where the solute is the doping element and by K. Morizane, A. F. Witt, and H. C. Gatos in the Journal of the Electrochemical Society 113, 51 (January 1966) for semiconductors grown by the Czochralski method.

(2) Natural convective flow produces mixing in the liquid and therefore will affect the transfer of solute away from the solid-liquid interface, e.g., in the case of alloys being grown from their melt. The result is a change in the overall distribution of solute in the solid formed from the melt. The possible extent of such change is shown in FIGURE 3. In the presence of substantial mass flow, regardless of whether it is laminar or turbulent, the normal solute distribution curve may be expected to assume the shape shown by curve A in FIGURE 3. In the complete absence of any mixing, a distribution of the form shown by curve B would be expected. The importance of natural convection in determining macroscopic solute distribution has been demonstrated experimentally by F. Weinberg in Trans. Met. Soc. AIME 227, 231 (1963). Fluid flow in ingots or castings would also be expected to have an effect on the distribution of solute in these structures.

(3) Turbulent convection with the resulting striations of solute is also known to be a factor in the introduction of dislocations into solids grown from the melt. This has been shown by A. J. Goss, K. E. Benson, and W. G. Pfann in Acta Metallurgica 4, 332 (1956).

(4) Ingot structure, e.g., in solidification of metal in casting, as well as elsewhere, is known to be affected by mass flow in the melt. Mass flow in ingots may be due both to the pouring of metal into the mold and to natural convection caused by density gradients in the liquid. In particular, the columnar-equiaxed transition often found in ingot solidification is strongly influenced by convection as shown by D. R. Uhlmann, T. P. Seward, and B. Chalmers in an article to be published in Trans. Met. Soc. AIME, and by a report by M. C. Flemings, H. P. Utech, and E. S. Miksch on "Effect of Fluid Flow on Solidification Structure." In addition, a variety of forms of solute banding has been observed experimentally in ingots and many of these are believed due to fluid flow.

(5) In the last mentioned reference, other effects of convection on ingot structure are shown, including the following:

(a) Enhanced growth of secondary dendrite arms on the "upstream" side of a growing dendrite.

(b) Alteration of the dendrite growth direction from the crystallographic direction toward the direction opposite flow, i.e., the upstream direction.

(c) Curving of the columnar grain boundaries toward the direction opposite flow.

(d) Alteration of casting texture from one where the preferred dendrite growth direction tends to be parallel to the heat flow direction to one where this direction lies between the heat flow direction and the direction opposite fluid flow.

An object of the invention described herein, in addition to the general objects previously stated, is to reduce or eliminate entirely the mass flow due to natural convection that may be occurring during solidification. This is done, according to the present invention, by imposing a transverse magnetic field on the liquid. It has previously been suggested, e.g., in U.S. Patent Uo. 3,079,246, that a magnetic field may be imposed on a molten mass as a sort of pumping action to cause flow or circulation, e.g., by periodically reversing the field. See also U.S. Patent No. 2,890,940. It is known of course that the motion of a conductor through the lines of force of a magnetic field is resisted by a force opposed to the direction of motion. This is Lenz's law. Thus the mass flow of liquid due to natural convection as described above will be resisted by application of the magnetic field. In a sense, the behavior of the liquid is as if its viscosity had been substantially increased by imposing the magnetic field on it. An alternative way of viewing or stating the effect of magnetic fields on liquids undergoing mass flow has been proposed by Chandrasekhar in the Philosophical Magazine, Series 7, volume 45, page 1177 (1954).

According to Chandrasekhar's conception, application of the field results in imparting an effective kinematic viscosity to the liquid, its value being given by the following expression:

$$v_{eff} = \mu^2 H^2 \sigma d^2 / \rho$$

where
$\mu$=magnetic permeability of the liquid,
$H$=strength of the magnetic field,
$\sigma$=electrical conductivity of the liquid,
$d$=depth of the liquid, and
$\rho$=density of the liquid.

Upon application of fields in excess of several hundred gauss to metallic liquids or other liquids that are good electrical conductors, the viscosity computed according to the above equation will in general be greater than the kinematic viscosity of such liquids in the absence of any field. The result will be a greater resistance to flow in the liquid. This resistance tends to dampen or erase the eddy currents and other minor phenomena of movement in the liquid. It also results in a reduction or damping of the laminar component of flow in the liquid. The extent of such reduction may be determined by the extent of reduction of the vertical temperature gradient in the system shown in FIGURE 1 and described above. The use of a magnetic field in these ways is an important aspect of the present invention.

As seen from the above equation, the extent of damping increases with both the strength of the magnetic field and the electrical conductivity of the liquid. Therefore, the technique is most practical when applied to substances such as metals and semiconductors whose liquids are at least fairly good electrical conductors. The fields required to produce substantial damping of flow in these systems can be readily achieved, at least whenever the volume of material to which they are applied is relatively small. For example, in crystal-growing systems, fields of less than 1000 gauss typically are sufficient to damp out turbulent temperature fluctuations in liquids of the character mentioned below.

Electromagnetic fields have been used in the past in connection with solidification of liquids as already mentioned. U.S. Patent No. 2,904,411 mentions a technique wherein the molten region is caused to traverse the solid body by applying an electric current to the mass while maintaining a magnetic field, thereby to generate a suspending or stabilizing force. Such a procedure could well have a tendency to dampen externally imposed vibrations of the molten material. However, the present invention is concerned with the purposeful damping of fluid convection currents within the body of liquid either to insure laminar as distinguished from turbulent flow of the liquid or to reduce both laminar and turbulent currents. Tiller and Johnston in U.S. Patent No. 3,203,768 deliberately use a rotating magnetic field to cause stirring. In the present invention a stationary field is used to reduce and control the convection.

The magnetic field may be either horizontal or vertical to produce the desired damping. The effects that can be achieved by application of the field are best illustrated by some examples describing experiments performed using the apparatus shon in FIGURE 4.

Referring to FIGURE 4, a gas tight tubular container body 21 which can be evacuated and/or filled with inert gas serves as a container and support for a movable boat 25. Boat 25 is acted on by a longitudinally movable rod 27 which passes in gas tight relationship through an end closure 29 which is sealed to the left end of tubular body 21. Drive means, not shown, which can be operated at various speeds, are operatively attached to the rod 27 so that the boat can be advanced (to the right, FIGURE 4) or retracted. A heating device such as a coil 31 of any suitable type, and supplied with energy from any suitable source, applies a suitable temperature gradient to the bolt 25, the hotter end being at the left so that solidification of the molten material in the boat begins at the right. Coil 31 is preferably heated electrically but other heating means can be used. A hollow liquid cooled element 33 in the right end of the boat promotes the cooling. A cooling liquid, such as water, although other heat exchange fluids can be used, is led in to element 33 through a line 35 and led out through another line 37, both lines passing in gas tight relationship through an end closure 39 at the right end of tubular body 31. A tubular connection 41 is also provided in the end closure 39 so that it may be evacuated and/or filled with inert gas. Additional connections may be provided if desired.

One or more thermocouples 45 are provided, with leads 47 extending through the end closure 29, to ascertain temperature at as many points in the boat as desired. As shown in FIGURE 4, the boat 25 contains molten liquid 49 at the left and a solid mass 51, formed by crystallization or other solidification, towards the right hand end of the boat, as seen in FIGURE 4.

The tubular member 21 with heating coil 31 thus constitutes a furnace. Referring further to FIGURE 4, for the experiments, the horizontal furnace and boat were placed within the poles of a vertical DC magnet 60 aligned so that the center of the pole gap where the field was maximum corresponded with the position of the solid-liquid interface.

EXAMPLE 1

A polycrystalline sample of tellurium-doped indium antimonide was grown from a melt using the apparatus shown in FIGURE 4. The first portion of the run took place with the magnet turned off. Temperature fluctuations 2 to 3° C. in amplitude were detected in the liquid and closely-spaced bands of tellurium were formed during this portion of the run. The temperature gradient in the liquid was approximately 30° C. per centimeter. The mean spacing of the striations formed during this portion of the run corresponded to the product of the growth rate of the sample and the mean period of the temperature fluctuations. Turning on the magnet 60 with a field strength of 1735 gauss at the center of the pole gap eliminated the temperature fluctuations and produced a band-free structure. This field was actually considerably larger than that needed simply to suppress the fluctuations but was applied for experimental convenience.

EXAMPLE 2

The same experiment was performed on an aluminum-0.27 percent copper alloy. In the absence of the field, temperature fluctuations of 3° C. in amplitude were detected and bands were formed in the solid alloy with a gradient of approximately 20° C. per centimeter in the liquid. The mean spacing of the bands did not correspond to the product of the period of the fluctuations and the growth rate but was an order of magnitude larger. However, when a field of 1750 gauss was applied, both temperature fluctuations and bands were eliminated.

EXAMPLE 3

Five samples of aluminum-rich aluminum-copper alloys were solidified both in the presence of 1700 gauss magnetic field and in the absence of any field and the resulting structures compared. Metallographic examination showed that the specimens grown in the presence of the field showed a higher concentration of solute in the solid than those grown in the absence of the field. This effect may best be understood by referring again to FIGURE 3. The effect of the magnetic field is to increase the concentration of solute in the solid throughout most of the sample (Curve B) by applying the magnetic field and eliminating the convective mixing over that which can be obtained without the field and in the presence of mixing (Curve A).

Various properties of the solid, such as its electrical, mechanical and other properties, its homogeneity and structure, its appearance in cross-section, etc., can be controlled or changed by the process of this invention. Improved products, particularly of metal alloys and doped semiconductors, are produced with close quality control, free of visible or micro-visible striations in cross-section, and free or substantially free of variations in electrical conductivity, thermal conductivity, magnetic susceptibility, nonhomogeneous susceptibility to oxidation, corrosion and other chemical effects, etc.

The invention is applicable to control of cooling and solidification of large castings as well as production of small solid-state electrical components. It is applicable to control of quality in the solid state of pure elemental materials, especially of metals, wherever a non-uniform or fluctuating cooling and/or circulation rate due to undesirable convection currents tends to produce non-homogeneous products, even if the inhomogeneity is one only of crystal growth rate, for example.

The magnetic field may be applied continuously or intermittently, and either during the actual solidification of a particular part or area or very shortly prior thereto, so long as the magnetic field is applied in time to suppress the undesirable liquid currents that directly or indirectly impair quality of the product or interfere with the desired steady transition from the liquid to solid state.

The invention, moreover, is applicable to practically all solidification systems, regardless of configuration or the method by which heat is supplied to the system or withdrawn from it. One possible exception probably would be induction heating where interactions of the fields induced by the heating coil would interact with the field of the magnet and produce complicated effects as in the prior art referred to above. The magnetic field strengths required to suppress turbulence are quite small, relatively speaking, and may easily be provided, either by permanent magnets or commercial electromagnets. Under some conditions it may be desirable to substantially suppress laminar flow also. Larger field strengths are needed to reduce substantially the laminar flow but these are still within the range of commercially available electromagnets, at least for smaller applications such as crystal growth.

By use of a plurality of thermocouples (only one is shown in FIGURE 4, but more may be used), e.g., along the bottom of the boat 25, FIGURE 4, as an example of one convenient arrangement, the effect on the liquid flow by convection, as obtained by applying the direct magnetic field may be observed and measured. As a matter of fact, this affords a means of measuring liquid flow rates in this and other systems. By taking similar tracings from separate thermocouples spaced apart a known or predetermined distance, the time lag between similar points on the curves gives an indication of mean flow velocity. An example of this is shown in FIGURE 5. Curve C in this figure is of the same general type (although not as widely fluctuating) as the curve of FIGURE 2. It was taken from a first thermocouple located in boat 25 one mm. from the floor. Curve D was taken simultaneously (on a 2-pen recorder) from a similar thermocouple located 5 mm. downstream from the first. The boat contained molten tin, the thermal gradient was 18.2° C./cm. The flow rate was 0.5 cm. in 0.5 second (the pens were offset one chart division as indicated) showing a flow rate of 1 cm./sec. This is another aspect of the present invention.

We claim:

1. A solidification process comprising introducing a liquid material into a mold, said liquid material having sufficient electrical conductivity that its motion in the presence of a magnetic field induces eddy currents, forming within said mold a solidification zone wherein transition from the liquid to the solid state occurs at a liquid-solid interface, said solidification zone being free of applied electrical current and applying a unidirectional stationary magnetic field to said solidification zone, the magnitude of said field being sufficient to produce an effective viscosity substantially greater than the kinematic viscosity of the liquid in the asbence of the field, whereby laminar and turbulent mass flow in the vicinity of the liquid-solid interface are suppressed.

2. A zone refining process comprising producing a molten zone free of applied electrical current in the material being refined, the material in said liquid state having sufficient conductivity that its motion in the presence of a magnetic field will induce eddy currents, moving said molten zone through said material, the trailing portion of said molten zone having a transition zone where a transition from liquid to solid state occurs at a liquid-solid interface, and applying a unidirectional stationary magnetic field to said transition zone, the magnitude of the field being sufficient to produce an effective viscosity substantially greater than the kinematic viscosity of said zone in the absence of said field whereby laminar and turbulent mass flow in the vicinity of the liquid-solid interface are suppressed.

3. The process according to claim 1 wherein said magnetic field is in excess of 200 gauss.

References Cited

UNITED STATES PATENTS

| 2,083,022 | 6/1937 | Hoke | 164—49 |
| 2,166,671 | 7/1939 | Trofimov | 164—49 XR |
| 2,904,411 | 9/1959 | Pfann. | |
| 2,970,830 | 2/1961 | Siegfried | 164—133 |
| 3,203,768 | 8/1965 | Tiller et al. | |
| 3,238,024 | 3/1966 | Cremer et al. | 23—301 |
| 3,241,924 | 3/1966 | Karstensen | 23—301 XR |
| 3,335,084 | 8/1967 | Hall | 148—1.6 XR |

L. DEWAYNE RUTLEDGE, Primary Examiner

P. WEINSTEIN, Assistant Examiner

U.S. Cl. X.R.

23—273, 295, 301; 75—10; 148—1.6; 164—49, 51, 133; 219—10.43; 252—62.3